(12) United States Patent
Wang et al.

(10) Patent No.: US 12,133,196 B2
(45) Date of Patent: Oct. 29, 2024

(54) COMMUNICATIONS METHOD AND APPARATUS

(71) Applicant: Huawei Technologies Co., Ltd., Shenzhen (CN)

(72) Inventors: Hong Wang, Beijing (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 595 days.

(21) Appl. No.: 17/226,937

(22) Filed: Apr. 9, 2021

(65) Prior Publication Data

US 2021/0227507 A1    Jul. 22, 2021

Related U.S. Application Data

(63) Continuation of application No. PCT/CN2018/109666, filed on Oct. 10, 2018.

(51) Int. Cl.
| | |
|---|---|
| *H04W 72/02* | (2009.01) |
| *H04W 24/10* | (2009.01) |
| *H04W 74/00* | (2009.01) |
| *H04W 76/27* | (2018.01) |

(52) U.S. Cl.
CPC ........... *H04W 72/02* (2013.01); *H04W 24/10* (2013.01); *H04W 74/00* (2013.01); *H04W 76/27* (2018.02)

(58) Field of Classification Search
CPC ..... H04W 72/02; H04W 24/10; H04W 74/00; H04W 76/27; H04W 72/543; H04W 74/0833; H04W 72/1268; H04W 72/569; H04W 80/02; H04W 72/20; Y02D 30/70
See application file for complete search history.

(56) References Cited

U.S. PATENT DOCUMENTS

| | | |
|---|---|---|
| 2016/0057785 A1 | 2/2016 | Zhang et al. |
| 2017/0280470 A1* | 9/2017 | Aoyama .............. H04W 72/569 |
| 2018/0227805 A1 | 8/2018 | Jang et al. |

FOREIGN PATENT DOCUMENTS

| | | |
|---|---|---|
| CN | 101981953 A | 2/2011 |
| CN | 102047586 A | 5/2011 |
| CN | 104854934 A | 8/2015 |

(Continued)

OTHER PUBLICATIONS

Samsung, "Discussion on Quality report in Msg3 for MTC," 3GPP TSG RAN WG1 Meeting #94bis, R1-1810823, total 4 pages, 3rd Generation Partnership Project, Valbonne, France (Oct. 8-12, 2018).

(Continued)

*Primary Examiner* — Mohammad S Adhami
*Assistant Examiner* — Jesse P. Samluk
(74) *Attorney, Agent, or Firm* — Leydig, Voit & Mayer, Ltd.

(57) ABSTRACT

A communications method and apparatus are provided. The method includes: generating, by a terminal device, a first media access control layer control element (MAC CE), where the first MAC CE includes channel quality information of the terminal device; determining, by the terminal device, whether to multiplex the first MAC CE into a message 3; and when determining to multiplex the first MAC CE into the message 3, sending, by the terminal device, the message 3 including the first MAC CE to a network device.

10 Claims, 5 Drawing Sheets

(56) References Cited

FOREIGN PATENT DOCUMENTS

| EP | 2924904 A1 | 9/2015 |
|---|---|---|
| WO | 2014101012 A1 | 7/2014 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.3.0, pp. 1-358, 3rd Generation Partnership Project, Valbonne, France (Sep. 2018).

"3rd Generation Partnership Project; Technical Specification Group Radio Access Network; NR; Medium Access Control (MAC) protocol specification (Release 15)," 3GPP TS 38.321 V15.3.0, pp. 1-76, 3rd Generation Partnership Project, Valbonne, France (Sep. 2018).

"3rd Generation Partnership Project; Technical Specification Group Radio Access Network; Evolved Universal Terrestrial Radio Access (E-UTRA); Requirements for support of radio resource management (Release 15)," 3GPP TS 36.133 V15.4.0, Total 1532 pages, 3rd Generation Partnership Project, Valbonne, France (Sep. 2018).

"3rd Generation Partnership Project; Technical Specification Group Services and System Aspects; Vocabulary for 3GPP Specifications (Release 15)," 3GPP TR 21.905 V15.0.0, pp. 1-65, 3rd Generation Partnership Project, Valbonne, France (Mar. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, pp. 1-918, 3rd Generation Partnership Project, Valbonne, France (Sep. 2018).

"DL quality reporting in Msg3 for eMTC," 3GPP TSG RAN WG1 Meeting #94bis, Chengdu, China, R1-1810738, Total 5 pages, 3rd Generation Partnership Project, Valbonne, France (Oct. 8-12, 2018).

"DL Quality reporting in Msg3," 3GPP TSG RAN WG2 Meeting #103bis, Chengdu, China, R2-1814249, Total 3 pages, XP051523702, 3rd Generation Partnership Project, Valbonne, France (Oct. 8-12, 2018).

"DL quality reporting in Msg3 for non-anchor access in NB-IoT," 3GPP TSG RAN WG1 Meeting #94bis, Chengdu, China, R1-1810743, Total 5 pages, XP051518147, 3rd Generation Partnership Project, Valbonne, France (Oct. 3-12, 2018).

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.3.0, pp. 1-127, XP051487508, 3rd Generation Partnership Project, Valbonne, France (Sep. 2018).

"Feature lead summary on support of quality report in Msg3 for non-anchor access," 3GPP TSG RAN WG1 Meeting #94, Gothenburg, Sweden, R1-1809600, Total 6 pages, XP051516961, 3rd Generation Partnership Project, Valbonne, France (Aug. 20-24, 2018).

"Quality report in Msg3," 3GPP TSG-RAN WG2 Meeting #103bis, Chengdu, China, R2-1814596, Total 5 pages, XP051524020, 3rd Generation Partnership Project, Valbonne, France (Oct. 8-12, 2018).

* cited by examiner

COMMUNICATIONS METHOD AND APPARATUS

CROSS-REFERENCE TO RELATED APPLICATIONS

This application is a continuation of International Application No. PCT/CN2018/109666, filed on Oct. 10, 2018, the disclosure of which is hereby incorporated by reference in its entirety.

TECHNICAL FIELD

This application relates to the field of wireless communications technologies, and in particular, to a communications method and apparatus.

BACKGROUND

A long term evolution (LTE) machine type communication (MTC) system or a narrow band Internet of Things (NB-IoT) system is different from conventional LTE communication, does not pursue a data transmission rate, a plurality of frequency bands, a plurality of antennas, or full-duplex transmission, but requires that a terminal device can implement low power consumption and low costs. Typical application scenarios of MTC or NB-IoT include a smart grid, smart agriculture, smart transportation, smart household, environment detection, and the like. In an application scenario of MTC or NB-IoT, data transmission in the application scenario is characterized by a relatively small amount of data and an uncertain time of arrival of the data. In the current technology, to transmit data between a terminal device and a base station, a radio resource control (RRC) connection needs to be first established through a random access (RA) process, and then the data is transmitted by using the established RRC connection. In the foregoing process, signaling overheads and a delay are relatively large, and power consumption of the terminal device is relatively large.

To reduce the signaling overheads and the delay, and reduce the power consumption of the terminal device, an early data transmission (EDT) technology is currently provided based on the random access process. In an EDT process, a terminal device may send uplink data to a base station through an RRC message in a message 3, or a base station may send downlink data to a terminal device through a message 4. Further, to better schedule the downlink data of the terminal device, in the random access process or the EDT process, a network device may require the terminal device to report channel quality information. However, in the random access process or the EDT process, how the terminal device reports the channel quality information is an urgent problem to be resolved.

SUMMARY

An objective of embodiments of this application is to provide a communications method and apparatus, to resolve a problem of how a terminal device reports channel quality information.

According to a first aspect, an embodiment of this application provides a communications method. The method includes: generating, by a terminal device, a first media access control (MAC) control element (CE), where the first MAC CE includes channel quality information of the terminal device: determining, by the terminal device, whether to multiplex the first MAC CE into a message 3; and when determining to multiplex the first MAC CE into the message 3, sending, by the terminal device, the message 3 including the first MAC CE to a network device.

In the foregoing method, the channel quality information is not sent through an RRC message in the message 3, but is sent through the first MAC CE in the message 3. If the terminal device initiates a conventional random access process or a downlink EDT process, the channel quality information does not occupy a resource of the RRC message. Therefore, when a resource of the message 3 is sufficiently large, or a logical channel prioritization (LCP) priority of the first MAC CE is relatively high, the terminal device may send the channel quality information. In this way, a probability of successfully sending the channel quality information is increased, and efficiency of sending the channel quality information is further improved. If the terminal device initiates an uplink EDT process, the channel quality information does not occupy a resource of uplink data in the RRC message. Therefore, when the resource of the message 3 is sufficiently large, or the LCP priority of the first MAC CE is relatively high, the terminal device may send the channel quality information. In this way, a probability of successfully sending the channel quality information is increased, and efficiency of sending the channel quality information is further improved.

In a possible design, the determining, by the terminal device, whether to multiplex the first MAC CE into a message 3 includes: determining, by the terminal device based on a LCP priority of the first MAC CE, whether to multiplex the first MAC CE into the message 3.

In the foregoing method, when sending the message 3, the terminal device determines, based on the LCP priority of the first MAC CE, whether to multiplex the first MAC CE into the message 3. When a transport block size (TBS) of the message 3 is relatively large, or the LCP priority of the first MAC CE is relatively high, the terminal device may send the first MAC CE through the message 3. In this way, a probability of successfully sending the channel quality information is increased, and efficiency of sending the channel quality information is further improved.

In a possible design, the LCP priority of the first MAC CE is higher than an LCP priority of a second MAC CE, and the second MAC CE is a MAC CE including a padding buffer status report (BSR).

In the foregoing method, because the padding BSR is sent by using an idle bit when the idle bit exists in the message 3, the LCP priority of the second MAC CE carrying the padding BSR may be lower than the LCP priority of the first MAC CE. In this way, a probability of successfully sending the channel quality information is increased, and efficiency of sending the channel quality information is further improved.

In a possible design, the LCP priority of the first MAC CE is lower than an LCP priority of a first media access control service data unit (MAC SDU), and the first MAC SDU is a MAC SDU including data of a logical channel.

In a possible design, the method further includes: receiving, by the terminal device, first indication information sent by the network device, where the first indication information is used to indicate the terminal device to report the channel quality information.

In a possible design, the method further includes: the terminal device has a capability of reporting the channel quality information.

According to a second aspect, an embodiment of this application provides a communications apparatus. The communications apparatus includes a processor, the processor is coupled to a memory, and the memory is configured to store an instruction. The processor is configured to execute the instruction stored in the memory, to perform the method in any one of the first aspect or the possible designs of the first aspect. Optionally, the communications apparatus may further include the memory. Optionally, the communications apparatus may further include a transceiver, configured to support the communications apparatus in sending and/or receiving information in the foregoing method. Optionally, the communications apparatus may be a terminal device, or may be an apparatus in a terminal device, for example, a chip or a chip system. The chip system includes at least one chip, and the chip system may further include another circuit structure and/or discrete component.

According to a third aspect, an embodiment of this application provides a communications apparatus, configured to implement the method in any one of the first aspect or the possible designs of the first aspect. The communications apparatus includes corresponding functional modules respectively configured to implement the steps in the foregoing method, for example, a processing unit and a transceiver unit.

According to a fourth aspect, an embodiment of this application provides a communications method. The method includes: receiving, by a network device, a message 3 sent by a terminal device; and when determining that the message 3 includes a first media access control layer control element MAC CE, determining, by the network device, quality of a channel between the network device and the terminal device based on channel quality information in the first MAC CE.

In the foregoing method, the channel quality information is not sent through an RRC message in the message 3, but is sent through the first MAC CE in the message 3. Therefore, the channel quality information does not occupy a resource of uplink data in the RRC message. In this way, a probability of successfully sending the channel quality information is increased, and efficiency of sending the channel quality information is further improved.

In a possible design, an LCP priority of the first MAC CE is higher than an LCP priority of a second MAC CE, and the second MAC CE is a MAC CE including a padding buffer status report BSR.

In a possible design, the LCP priority of the first MAC CE is lower than an LCP priority of a first media access control service data unit MAC SDU, and the first MAC SDU is a MAC SDU including data of a logical channel.

According to a fifth aspect, an embodiment of this application provides a communications apparatus. The communications apparatus includes a processor, the processor is coupled to a memory, and the memory is configured to store an instruction. The processor is configured to execute the instruction stored in the memory, to perform the method in any one of the fourth aspect or the possible designs of the fourth aspect. Optionally, the communications apparatus may further include the memory. Optionally, the communications apparatus may further include a transceiver, configured to support the communications apparatus in sending and/or receiving information in the foregoing method. Optionally, the communications apparatus may be a network device, or may be an apparatus in a network device, for example, a chip or a chip system. The chip system includes at least one chip, and the chip system may further include another circuit structure and/or discrete component.

According to a sixth aspect, an embodiment of this application provides a communications apparatus, configured to implement the method in any one of the fourth aspect or the possible designs of the fourth aspect. The communications apparatus includes corresponding functional modules respectively configured to implement the steps in the foregoing method, for example, a processing unit and a transceiver unit.

According to a seventh aspect, an embodiment of this application provides a communications method. The method includes: determining, by a terminal device, whether to send channel quality information through a message 3; and if determining to send the channel quality information through the message 3, generating, by the terminal device, a radio resource control RRC message including the channel quality information, and sending the message 3 including the RRC message to a network device.

In the foregoing method procedure, before sending the message 3, the terminal device needs to determine whether to send the channel quality information through the message 3. The terminal device sends, through the message 3, the RRC message including the channel quality information only when determining that the channel quality information can be sent through the message 3, so that resource utilization is improved while uplink data transmission is ensured.

In a possible design, the determining, by a terminal device, whether to send channel quality information through a message 3 includes: determining, by the terminal device based on a TBS of the message 3, whether to send the channel quality information through the message 3.

In a possible design, the determining, by the terminal device based on a TBS of the message 3, to send the channel quality information through the message 3 includes: when determining that the TBS of the message 3 is greater than or equal to a first threshold, determining, by the terminal device, to send the channel quality information through the message 3.

According to the foregoing method, regardless of whether the terminal device initiates a conventional random access process, a downlink EDT process, or an uplink EDT process, the terminal device sends the channel quality information through the message 3 only when determining that the TBS of the message 3 is greater than or equal to the first threshold and determining that a resource of the message 3 is sufficiently large. In this way, a probability of successfully sending the channel quality information is increased, and efficiency of sending the channel quality information is further improved.

In a possible design, the method further includes: receiving the first threshold from the network device.

In a possible design, the first threshold is a sum of a TBS needed by uplink data carried in the message 3 and a TBS needed by the RRC message including the channel quality information.

When the terminal device determines that the TBS of the message 3 is greater than or equal to the first threshold, to be specific, when the TBS of the message 3 can accommodate both the uplink data and the RRC message that includes the channel quality information, it may be considered that the TBS of the message 3 is sufficiently large to carry the channel quality information. In this way, it is determined that the channel quality information can be sent through the message 3.

In a possible design, the TBS of the message 3 is indicated by a MAC layer of the terminal device to an RRC layer of the terminal device.

In a possible design, the determining, by a terminal device, whether to send channel quality information through a message 3 includes: when determining that the message 3 is a message in an early data transmission EDT process, determining, by the terminal device, to send the channel quality information through the message 3.

In the foregoing process, when the terminal device determines, based on the TBS of the message 3, whether to send the channel quality information in the RRC message, when the TBS of the message 3 is not sufficiently large, the terminal device may preferentially send data through the message 3. The channel quality information is used as auxiliary information, and may not be temporarily sent. Correspondingly, when the TBS of the message 3 is sufficiently large, the terminal device may send the channel quality information through the message 3.

In a possible design, the RRC message is an RRC early data transmission request message, an RRC connection resume request message, an RRC connection reestablishment request message, or an RRC connection request message.

In a possible design, the method further includes: receiving, by the terminal device, first indication information sent by the network device, where the first indication information is used to indicate the terminal device to report the channel quality information.

In a possible design, the terminal device has a capability of reporting the channel quality information.

According to an eighth aspect, an embodiment of this application provides a communications apparatus. The communications apparatus includes a processor, the processor is coupled to a memory, and the memory is configured to store an instruction. The processor is configured to execute the instruction stored in the memory, to perform the method in any one of the eighth aspect or the possible designs of the eighth aspect. Optionally, the communications apparatus may further include the memory. Optionally, the communications apparatus may further include a transceiver, configured to support the communications apparatus in sending and/or receiving information in the foregoing method. Optionally, the communications apparatus may be a terminal device, or may be an apparatus in a terminal device, for example, a chip or a chip system. The chip system includes at least one chip, and the chip system may further include another circuit structure and/or discrete component.

According to a ninth aspect, an embodiment of this application provides a communications apparatus, configured to implement the method in any one of the eighth aspect or the possible designs of the eighth aspect. The communications apparatus includes corresponding functional modules respectively configured to implement the steps in the foregoing method, for example, a processing unit and a transceiver unit.

According to a tenth aspect, an embodiment of this application provides a communications method. The method includes: receiving, by a network device, a message 3 sent by a terminal device; and when determining that an RRC message in the message 3 includes channel quality information, determining, by the network device, quality of a channel between the network device and the terminal device based on the channel quality information.

In the foregoing method procedure, before sending the message 3, the terminal device needs to determine whether to send the channel quality information through the message 3. The terminal device sends, through the message 3, the RRC message including the channel quality information only when determining that the channel quality information can be sent through the message 3, so that resource utilization is improved while uplink data transmission is ensured.

In a possible design, the method further includes: sending, by the network device, a first threshold the terminal device.

According to an eleventh aspect, an embodiment of this application provides a communications apparatus. The communications apparatus includes a processor, the processor is coupled to a memory, and the memory is configured to store an instruction. The processor is configured to execute the instruction stored in the memory, to perform the method in any one of the tenth aspect or the possible designs of the tenth aspect. Optionally, the communications apparatus may further include the memory. Optionally, the communications apparatus may further include a transceiver, configured to support the communications apparatus in sending and/or receiving information in the foregoing method. Optionally, the communications apparatus may be a network device, or may be an apparatus in a network device, for example, a chip or a chip system. The chip system includes at least one chip, and the chip system may further include another circuit structure and/or discrete component.

According to a twelfth aspect, an embodiment of this application provides a communications apparatus, configured to implement the method in any one of the tenth aspect or the possible designs of the tenth aspect. The communications apparatus includes corresponding functional modules respectively configured to implement the steps in the foregoing method, for example, a processing unit and a transceiver unit.

An embodiment of this application provides a computer-readable storage medium. The computer storage medium stores a computer-readable instruction. When a computer reads and executes the computer-readable instruction, a communications apparatus is enabled to perform the method in any one of the foregoing possible designs.

An embodiment of this application provides a computer program product. When a computer reads and executes the computer program product, a communications apparatus is enabled to perform the method in any one of the foregoing possible designs.

An embodiment of this application provides a chip. The chip is connected to a memory, and is configured to read and execute a software program stored in the memory, to implement the method in any one of the foregoing possible designs.

An embodiment of this application provides a communications apparatus. The communications apparatus includes a processor, and the processor is configured to be coupled to a memory and read and execute an instruction in the memory, to implement the method according to any one of the foregoing aspects or the possible designs of the foregoing aspects.

An embodiment of this application provides a communications system, including the communications apparatus in the second aspect and the communications apparatus in the fifth aspect.

DESCRIPTION OF EMBODIMENTS

The following further describes in detail embodiments of this application with reference to the accompanying drawings.

The embodiments of this application may be applied to various mobile communications systems, for example, a new radio (NR) system, a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-A) system, and other communications systems. Details are not limited herein.

Figure 1:
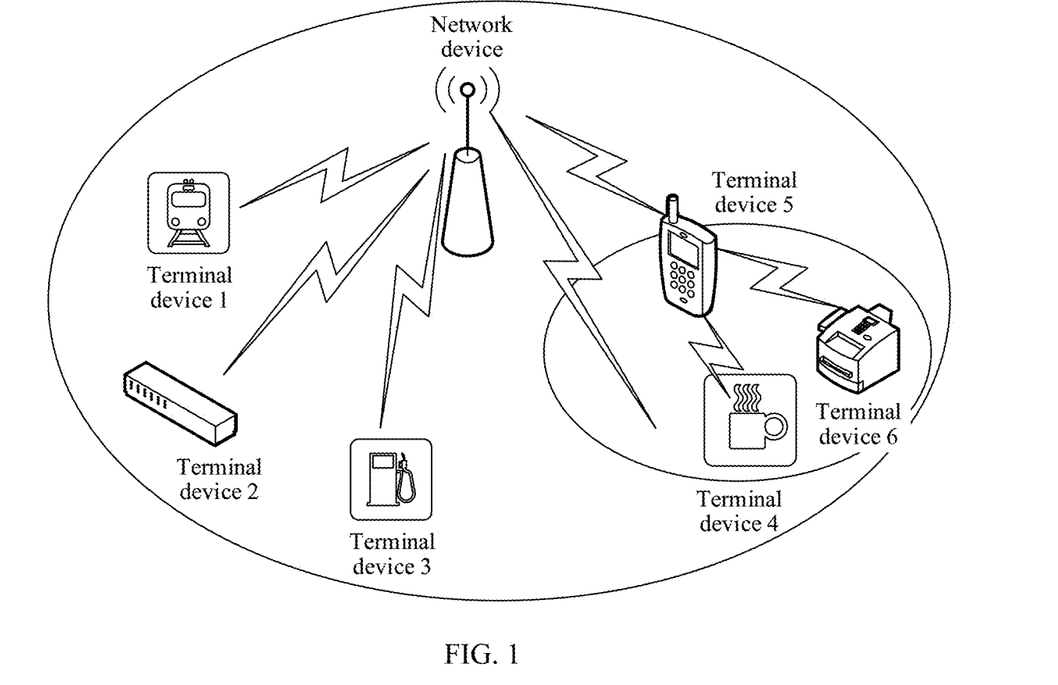
FIG. 1 is a schematic diagram of a communications system to which a communications method according to embodiments of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system to which a communications method according to embodiments of this application is applicable. As shown in FIG. 1, a base station and a terminal device 1 to a terminal device 6 form a communications system. In the communications system, the base station sends information to one or more of the terminal device 1 to the terminal device 6. In addition, the terminal device 4 to the terminal device 6 also form a communications system. In the communications system, the terminal device 5 may send information to one or both of the terminal device 4 and the terminal device 6.

Specifically, the terminal device in the embodiments of this application is a device that provides voice and/or data connectivity for a user and that has a wireless sending/receiving function or a chip that may be disposed in the device. The terminal device may communicate with one or more core networks through a radio access network (RAN). The terminal device may be a mobile phone, a tablet computer, a computer with a wireless transceiver function, a personal digital assistant (PDA) virtual reality (VR) terminal, an augmented reality (AR) terminal, a wireless terminal in industrial control, a wireless terminal in a self driving application, a wireless terminal in a remote medical application, a wireless terminal in a smart grid, a wireless terminal in a transportation safety application, a wireless terminal in a smart city, a wireless terminal in a smart home, or the like. An application scenario is not limited in the embodiments of this application. In this application, the terminal device and the chip that may be disposed in the terminal device are collectively referred to as a terminal device. The terminal device in the embodiments of this application may also be referred to as user equipment (UE), a user terminal, an access terminal, a subscriber unit, a subscriber station, a mobile station, a mobile console, a remote station, a remote terminal, a mobile device, a wireless communications device, a user agent, or a user apparatus.

A network device is a device having a wireless transceiver function or a chip that may be disposed in the device. The network device may be configured to mutually convert a received over-the-air frame and an IP packet, serves as a router between the terminal device and a remaining part of an access network, and may be further configured to coordinate attribute management on an over-the-air interface. The device includes but is not limited to: an evolved NodeB (eNB), a radio network controller (RNC), a NodeB (NB), a base station controller (BSC), a base transceiver station (BTS), a home base station (for example, a home evolved NodeB, or a home Node B, HNB), a baseband unit (BBU), an access point (AP) in a wireless fidelity (WIFI) system, a wireless relay node, a wireless backhaul node, a transmission point (TRP or transmission point. TP), or the like, or may be a gNB or a transmission point (TRP or TP) in a 5G (NR) system, one antenna panel or a group of antenna panels (including a plurality of antenna panels) of a base station in a 5G system, or the like.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

The embodiments of this application may be applied to networks such as NB-IoT and enhanced machine type communication (eMTC). In some scenarios in the embodiments of this application, a scenario of an NB-IoT network in a wireless communications network is used as an example for description. It should be noted that the solutions in the embodiments of this application may be further applied to another wireless communications network, and a corresponding name may also be replaced with a name of a corresponding function in another wireless communications network.

The embodiments of this application may be applied to a random access process or an EDT process. The random access process or the EDT process may be shown in FIG. 2, and mainly includes a four-step message procedure.

Figure 2:
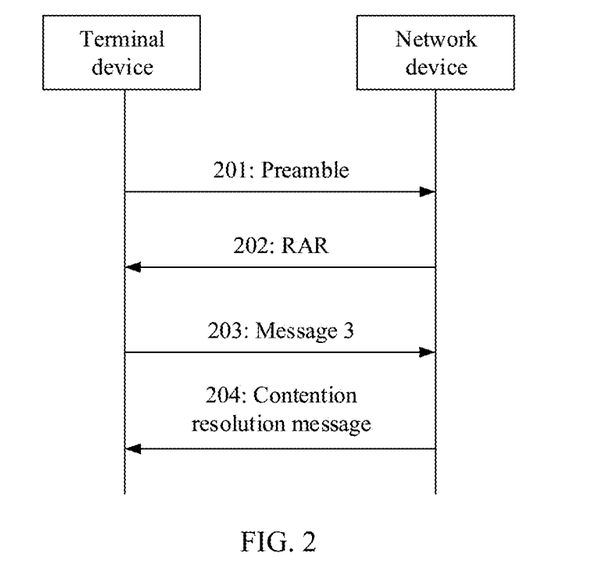
FIG. 2 is a schematic flowchart of a random access process or an EDT process in the current technology.

Step 201: A terminal device sends a random access preamble to a network device.

The random access preamble is also referred to as a message 1 (msg 1), and is used to initiate a random access process or an EDT process.

It should be noted that, in a current NB-IoT system, there are a plurality of preambles that can be used. These preambles may be divided into two orthogonal sets. Preambles in one set are used to initiate a random access process, and the set is referred to as a set 1 for short below: Preambles in the other set are used to initiate an EDT process, and the set is referred to as a set 2 for short below: If a preamble sent by the terminal device comes from the set 1, the preamble is used to initiate the random access process. If a preamble sent by the terminal device comes from the set 2, the preamble is used to initiate an EDT process.

It should be noted that the EDT process may further be divided into an uplink EDT process and a downlink EDT process. The uplink EDT process is actively initiated by the terminal device when the terminal device needs to send uplink data, and a preamble sent by the terminal device comes from the set 2. The network device may determine, based on the received preamble, whether the terminal device initiates the uplink EDT process. The downlink EDT process is initiated by the network device. For example, when a network side needs to send downlink data to the terminal device, the network device may indicate the terminal device to initiate the downlink EDT process.

Step 202: The network device sends a random access response (RAR) to the terminal device.

The RAR may also be referred to as a message 2 (msg 2).

Step 203: The terminal device sends a message 3 (msg 3) to the network device.

In a random access process, the message 3 does not include uplink data. In the uplink EDT process, the message 3 includes uplink data that needs to be sent by the terminal device.

It should be noted that the message 3 is sent in a form of a media access control (MAC) protocol data unit (PDU). Currently, the MAC PDU includes M MAC service data units (SDU) and N MAC control elements (CE). M and N are integers greater than or equal to 0. Each MAC SDU or each MAC CE corresponds to one logical channel prioritization (LCP) priority, and an LCP priority of each MAC SDU or each MAC CE is configured by the network device or is agreed on in advance in a protocol.

Uplink data that may need to be sent by the terminal device is located in the message 3. Because the terminal device needs to preferentially send an RRC message, an LCP priority of a MAC SDU carrying the RRC message is the highest, and the terminal device preferentially multiplexes the MAC SDU carrying the RRC message into a MAC PDU of the message 3.

Step 204: The network device sends a contention resolution message to the terminal device.

The message may also be referred to as a message 4 (msg 4). In the downlink EDT process, the message 4 further includes downlink data sent by the network device to the terminal device.

In conclusion, main differences between the random access process and the EDT process lie in the message 3 and the message 4. In the random access process, the message 3 does not include uplink data, and the message 4 does not include downlink data. In the uplink EDT process, the message 3 includes uplink data that needs to be sent by the terminal device. In the downlink EDT process, the message 4 further includes downlink data sent by the network device to the terminal device.

Figure 3:
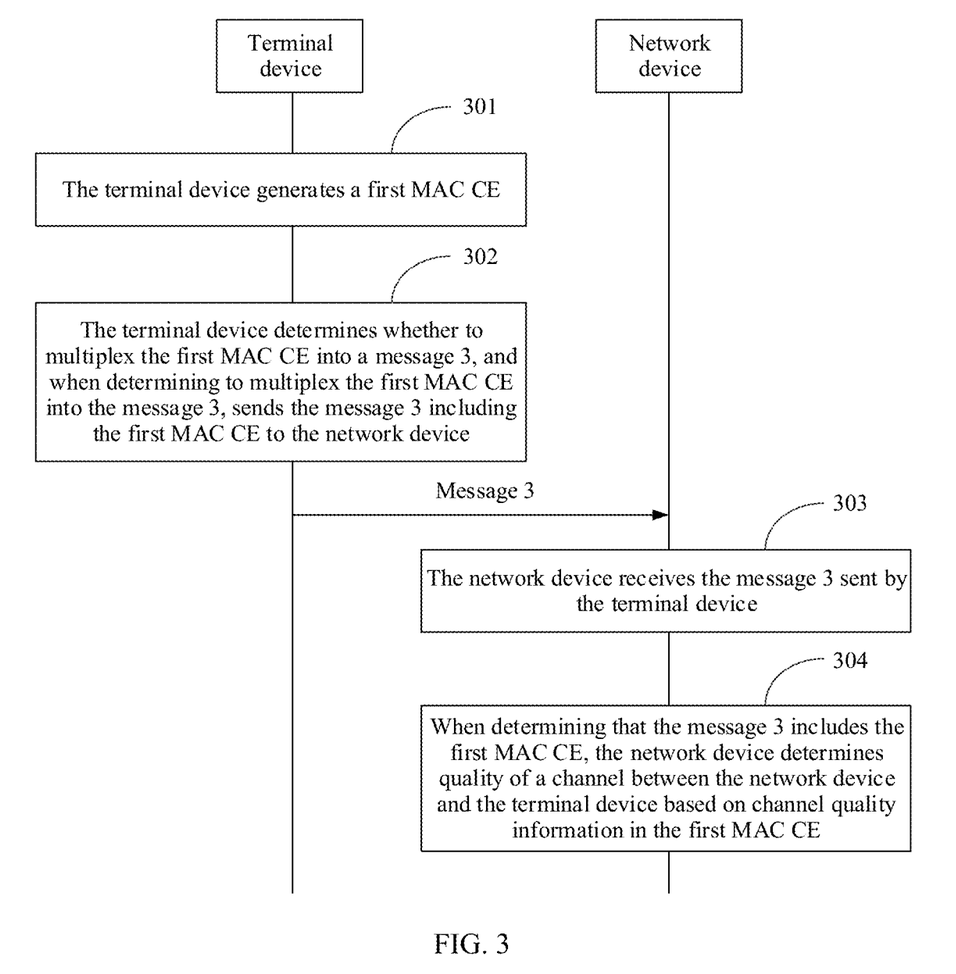
FIG. 3 is a schematic flowchart of a communications method according to an embodiment of this application.

With reference to the foregoing descriptions, FIG. 3 is a schematic flowchart of a communications method according to an embodiment of this application. The procedure shown in FIG. 3 may be applied to a random access process or an EDT process.

Referring to FIG. 3, the method includes the following steps.

Step 301: A terminal device generates a first MAC CE.

The first MAC CE includes channel quality information of the terminal device.

Before the terminal device generates the first MAC CE, the following process is further included: the terminal device sends a preamble to a network device, where the preamble is used to initiate a random access process or EDT; the terminal device receives an RAR sent by the network device, where the RAR is sent by the network device after the network device receives the preamble.

Step 302: The terminal device determines whether to multiplex the first MAC CE into a message 3: when determining to multiplex the first MAC CE into the message 3, the terminal device sends the message 3 including the first MAC CE to the network device.

Correspondingly, when determining not to multiplex the first MAC CE into the message 3, the terminal device sends, to the network device, the message 3 that does not include the first MAC CE.

In this embodiment of this application, the terminal device may determine, based on an LCP priority of the first MAC CE, whether to multiplex the first MAC CE into the message 3, or may determine, in another manner, whether to multiplex the first MAC CE into the message 3. Details are not described herein.

It should be noted that the LCP priority of the first MAC CE is preconfigured. How to specifically configure the LCP priority of the first MAC CE is not limited in this embodiment of this application. The message 3 further includes a MAC SDU carrying an RRC message, an LCP priority of the MAC SDU carrying the RRC message is the highest, and the terminal device preferentially multiplexes the MAC SDU carrying the RRC message into a MAC PDU of the message 3.

The RRC message may be an RRC early data request message, an RRC connection resume request message, an RRC connection reestablishment request message, an RRC connection request message, or the like.

It should be noted that before step 301 or 302, the terminal device may further perform step 301 or 302 when determining that at least one of the following conditions is met:

the terminal device receives first indication information sent by the network device, where the first indication information is used to indicate the terminal device to report the channel quality information; and the terminal device has a capability of reporting the channel quality information. In this embodiment of this application, the channel quality information may be a channel quality indicator (CQI), a quantity of repetitions of data transmission performed by the terminal device, or a reference signal received power (RSRP) or reference signal received quality (RSRQ) that is determined by the terminal device, or the like. This is not limited in this embodiment of this application.

When at least one of the foregoing conditions is met, the terminal device determines that the channel quality information needs to be sent through the message 3 in the random access process or the EDT process.

Step 303: The network device receives the message 3 sent by the terminal device.

When the message 3 includes the first MAC CE, the first MAC CE is multiplexed by the terminal device into the message 3 based on the LCP priority of the first MAC CE.

Step 304: When determining that the message 3 includes the first MAC CE, the network device determines quality of a channel between the network device and the terminal device based on the channel quality information in the first MAC CE.

Because a resource of the RRC message in the message 3 is limited, in the random access process or the EDT process, the terminal device may fail to send the channel quality information through the RRC message in the message 3. Even if the terminal device sends the channel quality information through the RRC message in the message 3, it is possible that, because the channel quality information occupies a resource of uplink data, the terminal device can transmit only a part of the uplink data, and further needs to apply for a new resource to transmit the uplink data. Consequently, a delay of the uplink data is relatively large.

In this embodiment of this application, the channel quality information is not sent through the RRC message in the message 3, but is sent through the first MAC CE in the message 3. If the terminal device initiates a conventional random access process or downlink EDT process, the channel quality information does not occupy the resource of the RRC message. Therefore, when a resource of the message 3 is sufficiently large, or the LCP priority of the first MAC CE is relatively high, the terminal device may send the channel quality information. In this way, a probability of successfully sending the channel quality information is increased, and efficiency of sending the channel quality information is further improved. If the terminal device initiates an uplink EDT process, the channel quality information does not occupy a resource of uplink data in the RRC message. Therefore, when the resource of the message 3 is sufficiently large, or the LCP priority of the first MAC CE is relatively high, the terminal device may send the channel quality information. In this way, a probability of successfully sending the channel quality information is increased, and efficiency of sending the channel quality information is further improved.

With reference to the foregoing descriptions, in this embodiment of this application, before sending the message 3, the terminal device generates P MAC SDUs and Q MAC CEs. The Q MAC CEs include the first MAC CE, and P and Q are integers greater than or equal to 0). The terminal device multiplexes, based on LCP priorities of the P MAC SDUs and the Q MAC CEs, a MAC SDU and a MAC CE that have higher priorities, and assembles the MAC SDU and the MAC CE into the MAC PDU of the message 3. The terminal device may determine, based on the LCP priority of the first MAC CE, whether to multiplex the first MAC CE into the message 3. For example, in a process of assembling the MAC PDU of the message 3, the terminal device may determine a transport block size (TBS) needed by all MAC SDUs and MAC CEs whose LCP priorities are higher than the LCP priority of the first MAC CE and that are in the P MAC SDUs and the Q MAC CEs. The TBS is referred to as a first TBS for short below: If determining that the first TBS is greater than or equal to a TBS of the message 3, the terminal device may determine not to multiplex the first MAC CE into the message 3. Correspondingly, if the terminal device determines that the first TBS is less than the TBS of the message 3 and that a difference between the TBS of the message 3 and the first TBS is greater than or equal to a TBS needed by the first MAC CE, the terminal device may determine to multiplex the first MAC CE into the message 3.

In the foregoing method procedure, the LCP priority of the first MAC CE including the channel quality information may be preconfigured. When sending the message 3, the terminal device determines, based on the LCP priority of the first MAC CE, whether to multiplex the first MAC CE into the message 3. When the TBS of the message 3 is relatively large, or the LCP priority of the first MAC CE is relatively high, the terminal device may send the first MAC CE through the message 3. In this way, a probability of successfully sending the channel quality information is increased, and efficiency of sending the channel quality information is further improved.

In this embodiment of this application, the LCP priority of the first MAC CE may be configured by the network device, may be preset, or may be determined by the terminal device. The LCP priority of the first MAC CE may be determined according to an actual situation. For example, the LCP priority of the first MAC CE may be higher than an LCP priority of a second MAC CE, and the second MAC CE is a MAC CE including a padding buffer status report (BSR).

Because the padding BSR is sent by using an idle bit when the idle bit exists in the message 3, the LCP priority of the second MAC CE carrying the padding BSR may be lower than the LCP priority of the first MAC CE.

In a first possible scenario, the terminal device needs to preferentially send uplink data. For example, when the terminal device needs to send the message 3 in the uplink EDT, the terminal device determines that the uplink data needs to be preferentially sent. Certainly, the foregoing description is merely an example. The terminal device may alternatively determine, according to another case, whether the terminal device needs to preferentially send the uplink data.

In this scenario, the LCP priority of the first MAC CE may be lower than an LCP priority of a first MAC SDU, and the first MAC SDU is a MAC SDU that includes data of a logical channel. In this case, the terminal device preferentially multiplexes the first MAC SDU into the MAC PDU of the message 3, so that a sending priority of the uplink data can be increased. The logical channel includes but is not limited to a broadcast channel, a common control channel, a dedicated control channel, and the like. Details are not described herein.

In the foregoing method, in the uplink EDT process, because the LCP priority of the first MAC CE is lower than the LCP priority of the first MAC SDU, sending of the uplink data may be preferentially ensured when the TBS of the message 3 is relatively small. When the TBS of the message 3 is relatively large, it can be ensured that the channel quality information is sent through the message 3 while all the uplink data is sent.

In a second possible scenario, the terminal device needs to preferentially receive downlink data sent by the network device. For example, when the terminal device needs to send the message 3 in the downlink EDT, the terminal device determines that the downlink data sent by the network device needs to be preferentially received. Certainly, the foregoing description is merely an example. The terminal device may alternatively determine, according to another case, whether the terminal device needs to preferentially receive the downlink data sent by the network device.

In this scenario, the LCP priority of the first MAC CE may be higher than the LCP priority of the first MAC SDU. In this case, the terminal device preferentially multiplexes the first MAC CE into the MAC PDU of the message 3, so that a sending priority of the channel quality information can be increased.

In the foregoing method, in the downlink EDT process, because the LCP priority of the first MAC CE is higher than the LCP priority of the first MAC SDU, the channel quality information may be preferentially sent, so that a success rate of sending the channel quality information can be increased.

In the first and the second possible scenarios, the reported channel quality information is carried by the first MAC CE, and does not involve an RRC layer. The terminal device may determine, at a MAC layer based on a TBS of the MAC PDU of the message 3, whether to send, in the message 3, the first MAC CE including the channel quality information.

In this embodiment of this application, because the LCP priority of the first MAC CE may be configured to be lower than an LCP priority of data of any logical channel, when the terminal device needs to send data, but the TBS of the MAC PDU is not sufficiently large for simultaneously sending the data and the first MAC CE, the terminal device preferentially sends the data, to ensure that data transmission is not affected by the reported channel quality information.

In addition, because the LCP priority of the first MAC CE may be configured to be higher than an LCP priority of data of any logical channel, when the terminal device needs to send data, but the TBS of the MAC PDU is not sufficiently large for simultaneously sending the data and the channel quality information MAC CE, the terminal device preferentially reports the channel quality information, and the data of the terminal device may be sent in subsequent transmission.

Figure 4:
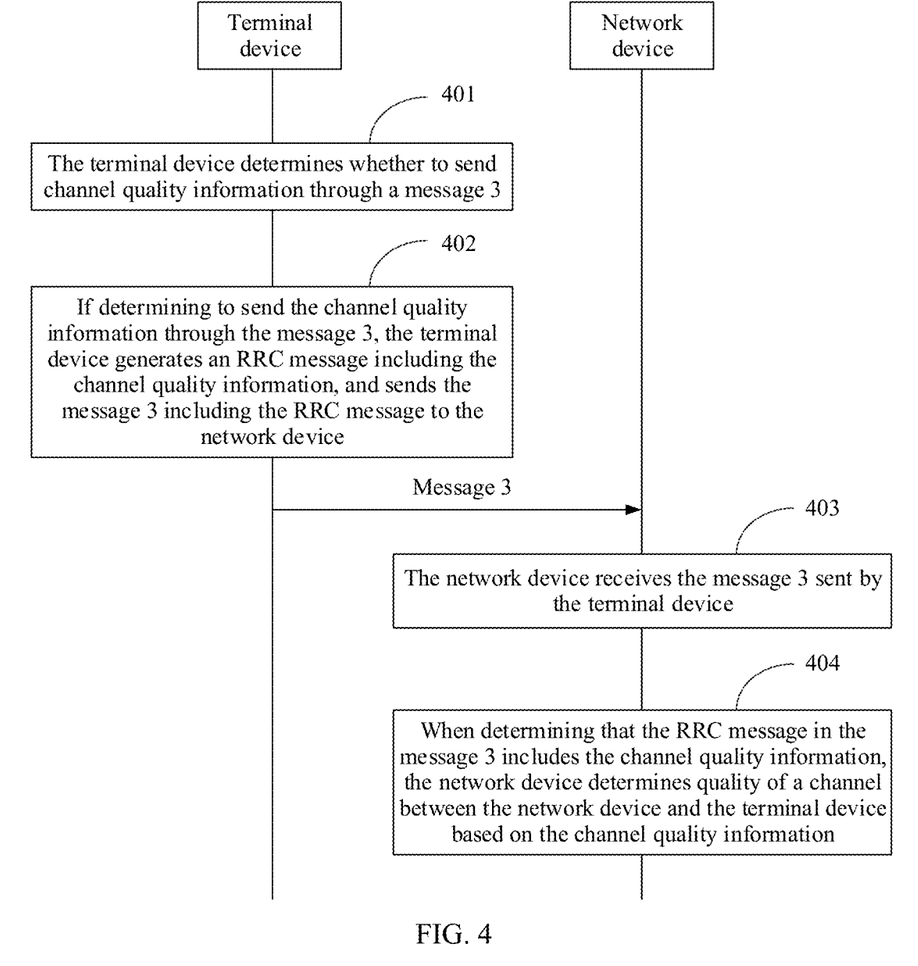
FIG. 4 is a schematic flowchart of a communications method according to an embodiment of this application.

In this embodiment of this application, when the random access process is currently performed, a TBS allocated by the network device to the message 3 is greater than or equal to 56 bits. It can only be ensured that an RRC message (where the RRC message is an RRC connection reestablishment request message, an RRC connection request message, or the like) that does not include the channel quality information can be sent. If an RRC message includes the channel quality information, a quantity of bits needed by the RRC message may be greater than the TBS that is of the message 3 and that is allocated by the network device. Consequently, the RRC message cannot be sent. Therefore, in this embodiment of this application, before sending the message 3, the terminal device may determine in advance whether the channel quality information can be sent through the message 3, thereby improving a probability of successfully sending the channel quality information. Details are described below:

With reference to the foregoing descriptions, FIG. 4 is a schematic flowchart of a communications method according to an embodiment of this application. The procedure shown in FIG. 4 may be applied to a random access process or an EDT process.

Referring to FIG. 4, the method includes the following steps.

Step 401: A terminal device determines whether to send channel quality information through a message 3.

Step 402: If determining to send the channel quality information through the message 3, the terminal device generates an RRC message including the channel quality information, and sends the message 3 including the RRC message to a network device.

The RRC message may be an RRC early data request message, an RRC connection resume request message, an RRC connection reestablishment request message, an RRC connection request message, or the like.

Step 403: The network device receives the message 3 sent by the terminal device.

Step 404: When determining that the RRC message in the message 3 includes the channel quality information, the network device determines quality of a channel between the network device and the terminal device based on the channel quality information.

In the foregoing method procedure, when the network device indicates that the terminal device is allowed to report the channel quality information, the network device usually allocates a sufficiently large TBS to the message 3. In this case, the terminal device may send the channel quality information through the message 3. However, currently, only some terminal devices support reporting of the channel quality information in the message 3. If the network device allocates the sufficiently large TBS to messages 3 of all terminal devices, a resource waste is caused for a terminal device that does not support reporting of the channel quality information. Therefore, the TBS allocated by the network device to the message 3 may be not sufficiently large for the terminal device to send the channel quality information.

Therefore, before sending the message 3, the terminal device needs to determine whether to send the channel quality information through the message 3. The terminal device sends, through the message 3, the RRC message including the channel quality information only when determining that the channel quality information can be sent through the message 3, so that resource utilization is improved while uplink data transmission is ensured.

It should be noted that before step 401 or 402, the terminal device may determine whether at least one of the following conditions is met:

the terminal device receives first indication information sent by the network device, where the first indication information is used to indicate the terminal device to report the channel quality information; and the terminal device has a capability of reporting the channel quality information.

When at least one of the foregoing conditions is met, the terminal device may send a preamble to the network device, where the preamble is used to initiate a random access process or EDT: the terminal device receives an RAR sent by the network device.

Before sending the message 3, the terminal device may determine, in a plurality of manners, whether to send the channel quality information through the message 3. Details are described below:

In a first possible implementation, the terminal device may determine, based on the TBS of the message 3, whether to send the channel quality information through the message 3.

Specifically, when determining that the TBS of the message 3 is greater than or equal to a first threshold, the terminal device may determine to send the channel quality information through the message 3. Correspondingly, when determining that the TBS of the message 3 is less than the first threshold, the terminal device may determine not to send the channel quality information through the message 3.

According to the foregoing method, regardless of whether the terminal device initiates a conventional random access process, a downlink EDT process, or an uplink EDT process, the terminal device sends the channel quality information through the message 3 only when determining that the TBS of the message 3 is greater than or equal to the first threshold and determining that a resource of the message 3 is sufficiently large. In this way, a probability of successfully sending the channel quality information is increased, and efficiency of sending the channel quality information is further improved.

In this embodiment of this application, the first threshold may be determined in a plurality of manners. For example, the first threshold may be sent by the network device, or may be pre-agreed on by the network device and the terminal device. For example, the network device may send the first threshold to the terminal device, and the first threshold may be 64 bits, 8 bytes, or the like. When the TBS of the message 3 is greater than or equal to the first threshold, the terminal device determines that the RRC message includes the channel quality information. Otherwise, the terminal device determines that the RRC message does not include the channel quality information.

Alternatively, the first threshold may be a sum of a TBS needed by uplink data carried in the message 3 and a TBS needed by the RRC message including the channel quality information. When the terminal device determines that the TBS of the message 3 is greater than or equal to the first threshold, to be specific, when the TBS of the message 3 can accommodate both the uplink data and the RRC message that includes the channel quality information, it may be considered that the TBS of the message 3 is sufficiently large to carry the channel quality information. Correspondingly, when the terminal device determines that the TBS of the message 3 is less than the first threshold, it may be considered that the TBS of the message 3 is relatively small and cannot carry the channel quality information.

In the foregoing process, when the terminal device determines, based on the TBS of the message 3, whether to send the channel quality information in the RRC message, when the TBS of the message 3 is not sufficiently large, the terminal device may preferentially send data through the message 3. The channel quality information is used as auxiliary information, and may not be temporarily sent. Correspondingly, when the TBS of the message 3 is sufficiently large, the terminal device may send the channel quality information through the message 3.

It should be noted that, in this embodiment of this application, the MAC PDU of the message 3 belongs to a MAC layer. Therefore, a MAC layer entity of the terminal device may determine the TBS of the message 3, and the MAC layer entity of the terminal device may indicate the TBS of the message 3 to an upper layer. The upper layer may be an RRC layer.

Further, in this embodiment of this application, the MAC layer entity of the terminal device may determine, based on the TBS of the message 3, whether to send the channel quality information through the message 3. For example, when the TBS of the message 3 is greater than or equal to the first threshold, the MAC layer entity of the terminal device determines that the RRC message includes the channel quality information, and sends transmission indication information to an RRC layer entity of the terminal device. The transmission indication information is used to indicate that the TBS of the message 3 is greater than or equal to the first threshold. Therefore, the RRC layer entity of the terminal device may determine that the RRC message needs to include the channel quality information.

Certainly, in this embodiment of this application, alternatively, the MAC layer entity of the terminal device may determine whether the RRC message in the message 3 includes the channel quality information, and indicate the channel quality information to the RRC layer entity. For example, when the TBS of the message 3 is greater than or equal to the first threshold, the MAC layer entity of the terminal device may directly indicate, to the RRC layer entity of the terminal device, that the RRC message includes the channel quality information. For another example, the MAC layer entity of the terminal device determines, based on information such as the TBS of the message 3 and the TBS needed by the uplink data, that the message 3 does not have sufficient resources to send the channel quality information, so as to indicate whether the RRC layer entity includes the channel quality information in the RRC message in the message 3.

In a second possible implementation, when determining that the message 3 is a message in the EDT process, the terminal device may determine that the terminal device is performing the uplink EDT process or performing the downlink EDT process. The terminal device may consider that the TBS of the message 3 is sufficiently large, so that the terminal device can send the channel quality information through the RRC message in the message 3. Alternatively, when the terminal device determines that the RRC message in the message 3 is an RRC early data request message or an RRC connection resume request message, the terminal device may consider that the TBS of the message 3 is sufficiently large, so that the channel quality information can be sent through the RRC message in the message 3. Correspondingly, when determining that the message 3 is a message in the random access process, the terminal device may determine that the TBS allocated by the network device to the message 3 is relatively small, and therefore, determine that the channel quality information cannot be sent through the RRC message in the message 3.

In the foregoing process, the terminal device determines, by determining a type of the message 3, whether the process is the uplink EDT process or the downlink EDT process. Because the TBS of the message 3 in the uplink EDT process or the downlink EDT process is usually sufficiently large, in most cases, it can be ensured that both the channel quality information and data of the terminal device are sent.

Figure 5:
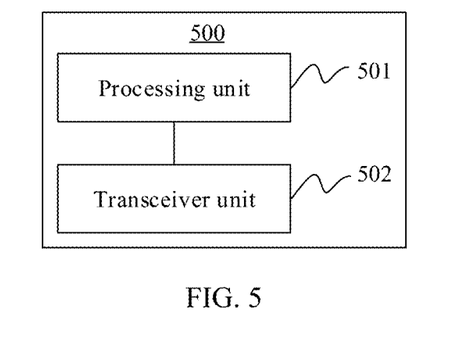
FIG. 5 is a schematic structural diagram of a communications apparatus according to an embodiment of this application.

FIG. 5 is a schematic structural diagram of a communications apparatus according to an embodiment of this application. The communications apparatus may be configured to perform an action of a terminal device in the procedure in FIG. 3 or FIG. 4. The communications apparatus 500 includes a processing unit 501 and a transceiver unit 502.

When the communications apparatus is configured to perform the action of the terminal device in the procedure in FIG. 3, the processing unit 501 and the transceiver unit 502 respectively perform the following content.

The processing unit 501 is configured to: generate a first media access control layer control element MAC CE, where the first MAC CE includes channel quality information; and determine whether to multiplex the first MAC CE into a message 3.

The transceiver unit 502 is configured to: when the processing unit 501 determines to multiplex the first MAC CE into the message 3, send the message 3 including the first MAC CE to a network device.

In a possible design, the processing unit 501 is specifically configured to:
  determine, based on an LCP priority of the first MAC CE, whether to multiplex the first MAC CE into the message 3.

In a possible design, an LCP priority of the first MAC CE is higher than an LCP priority of a second MAC CE, and the second MAC CE is a MAC CE including a padding BSR.

In a possible design, the LCP priority of the first MAC CE is lower than an LCP priority of a first MAC SDU, and the first MAC SDU is a MAC SDU including data of a logical channel.

In a possible design, the transceiver unit 502 is further configured to: receive first indication information sent by the network device, where the first indication information is used to indicate the terminal device to report the channel quality information.

In a possible design, the processing unit 501 has a capability of reporting the channel quality information.

When the communications apparatus is configured to perform the action of the terminal device in the procedure in FIG. 4, the processing unit 501 and the transceiver unit 502 respectively perform the following content.

The processing unit 501 is configured to determine whether to send channel quality information through a message 3.

The transceiver unit 502 is configured to: if the processing unit 501 determines to send the channel quality information through the message 3, generate a radio resource control RRC message including the channel quality information, and send the message 3 including the RRC message to a network device.

In a possible design, the processing unit 501 is specifically configured to:
determine, based on a TBS of the message 3, whether to send the channel quality information through the message 3.

In a possible design, the processing unit 501 is specifically configured to:
when determining that the TBS of the message 3 is greater than or equal to a first threshold, determine to send the channel quality information through the message 3.

In a possible design, the transceiver unit 502 is further configured to: receive the first threshold from the network device.

In a possible design, the first threshold is a sum of a TBS needed by uplink data carried in the message 3 and a TBS needed by the RRC message including the channel quality information.

In a possible design, the TBS of the message 3 is indicated by a media access control MAC layer of the terminal device to an RRC layer of the terminal device.

In a possible design, the processing unit 501 is specifically configured to: when determining that the message 3 is a message in an EDT process, determine to send the channel quality information through the message 3.

In a possible design, the RRC message is an RRC early data transmission request message, an RRC connection resume request message, an RRC connection reestablishment request message, or an RRC connection request message.

In a possible design, the transceiver unit 502 is further configured to: receive first indication information sent by the network device, where the first indication information is used to indicate the terminal device to report the channel quality information.

In a possible design, the processing unit 501 has a capability of reporting the channel quality information.

Figure 6:
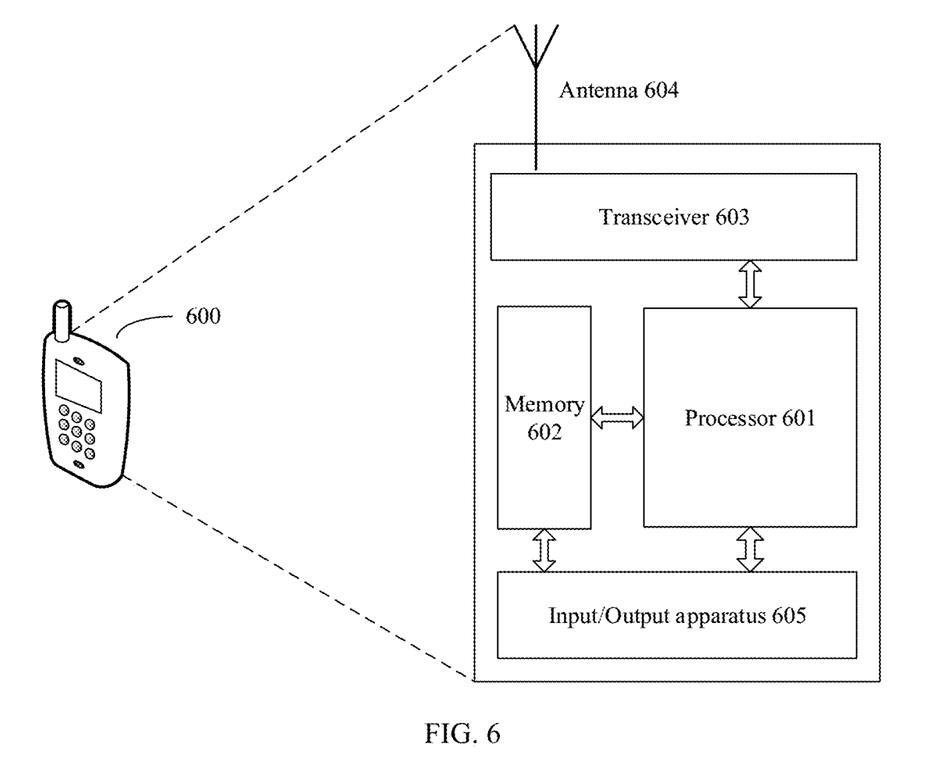
FIG. 6 is a schematic structural diagram of a communications apparatus according to an embodiment of this application.

FIG. 6 is a schematic structural diagram of a communications apparatus according to an embodiment of this application. The communications apparatus shown in FIG. 6 may be an implementation of a hardware circuit of the communications apparatus shown in FIG. 5. The communications apparatus is applicable to the flowchart shown in FIG. 3 or FIG. 4, and perform functions of the terminal device in the foregoing method embodiments. For ease of description, FIG. 6 shows only main components of the communications apparatus. Optionally, the communications apparatus may be a terminal device, or may be an apparatus in a terminal device, for example, a chip or a chip system. The chip system includes at least one chip, and the chip system may further include another circuit structure and/or discrete component. Optionally, for example, the communications apparatus is a terminal device. As shown in FIG. 6, the communications apparatus 600 includes a processor 601, a memory 602, a transceiver 603, an antenna 604, and an input/output apparatus 605. The processor 601 is mainly configured to: process a communication protocol and communication data: control the entire wireless communications apparatus: execute a software program; and process data of the software program. For example, the processor 601 is configured to support the wireless communications apparatus in performing actions described in the foregoing method embodiments. The memory 602 is mainly configured to store the software program and the data. The transceiver 603 is mainly configured to: perform conversion between a baseband signal and a radio frequency signal and processing of the radio frequency signal. The antenna 604 is mainly configured to send and receive a radio frequency signal in an electromagnetic wave form. The input/output apparatus 605, for example, a touchscreen, a display, or a keyboard, is mainly configured to receive data entered by a user and output data to the user.

When the communications apparatus is configured to perform a function of the terminal device in the flowchart shown in FIG. 3:
the processor 601 is configured to: generate a first MAC CE, where the first MAC CE includes channel quality information; and determine whether to multiplex the first MAC CE into a message 3; and
the transceiver 603 is configured to: when the processor 601 determines to multiplex the first MAC CE into the message 3, send the message 3 including the first MAC CE to a network device.

In a possible design, the processor 601 is specifically configured to:
determine, based on an LCP priority of the first MAC CE, whether to multiplex the first MAC CE into the message 3.

In a possible design, an LCP priority of the first MAC CE is higher than an LCP priority of a second MAC CE, and the second MAC CE is a MAC CE including a padding BSR.

In a possible design, the LCP priority of the first MAC CE is lower than an LCP priority of a first MAC SDU, and the first MAC SDU is a MAC SDU including data of a logical channel.

In a possible design, the transceiver 603 is further configured to: receive first indication information sent by the network device, where the first indication information is used to indicate the terminal device to report the channel quality information.

In a possible design, the processor 601 has a capability of reporting the channel quality information.

When the communications apparatus is configured to perform an action of the terminal device in the procedure in FIG. 4:
the processor 601 is configured to determine whether to send channel quality information through a message 3; and
the transceiver 603 is configured to: if the processor 601 determines to send the channel quality information through the message 3, generate a radio resource control RRC message including the channel quality information, and send the message 3 including the RRC message to a network device.

In a possible design, the processor 601 is specifically configured to:
determine, based on a TBS of the message 3, whether to send the channel quality information through the message 3.

In a possible design, the processor 601 is specifically configured to:
when determining that the TBS of the message 3 is greater than or equal to a first threshold, determine to send the channel quality information through the message 3.

In a possible design, the transceiver 603 is further configured to: receive the first threshold from the network device.

In a possible design, the first threshold is a sum of a TBS needed by uplink data carried in the message 3 and a TBS needed by the RRC message including the channel quality information.

In a possible design, the TBS of the message 3 is indicated by a MAC layer of the terminal device to an RRC layer of the terminal device.

In a possible design, the processor 601 is specifically configured to: when determining that the message 3 is a message in an EDT process, determine to send the channel quality information through the message 3.

In a possible design, the RRC message is an RRC early data transmission request message, an RRC connection resume request message, an RRC connection reestablishment request message, or an RRC connection request message.

In a possible design, the transceiver 603 is further configured to: receive first indication information sent by the network device, where the first indication information is used to indicate the terminal device to report the channel quality information.

In a possible design, the processor 601 has a capability of reporting the channel quality information.

Figure 7:
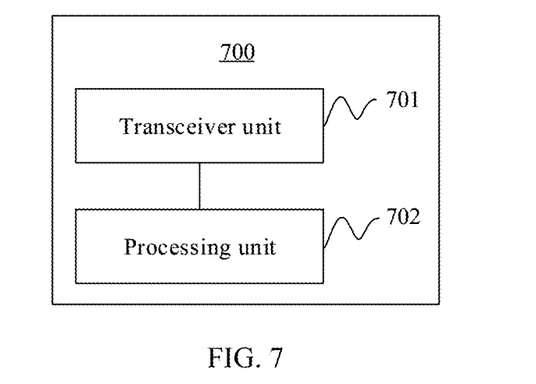
FIG. 7 is a schematic structural diagram of a communications apparatus according to an embodiment of this application.

FIG. 7 is a schematic structural diagram of a communications apparatus according to an embodiment of this application. The communications apparatus may be configured to perform an action of a network device in the procedure in FIG. 3 or FIG. 4. The communications apparatus 700 includes a processing unit 702 and a transceiver unit 701.

When the communications apparatus is configured to perform the action of the network device in the procedure in FIG. 3, the processing unit 702 and the transceiver unit 701 respectively perform the following content.

The transceiver unit 701 is configured to receive a message 3 sent by a terminal device.

The processing unit 702 is configured to: when determining that the message 3 includes a first MAC CE, determine quality of a channel between the network device and the terminal device based on channel quality information in the first MAC CE.

In a possible design, an LCP priority of the first MAC CE is higher than an LCP priority of a second MAC CE, and the second MAC CE is a MAC CE including a padding BSR.

In a possible design, the LCP priority of the first MAC CE is lower than an LCP priority of a first MAC SDU, and the first MAC SDU is a MAC SDU including data of a logical channel.

When the communications apparatus is configured to perform the action of the network device in the procedure in FIG. 4, the processing unit 702 and the transceiver unit 701 respectively perform the following content.

The transceiver unit 701 is configured to receive a message 3 sent by a terminal device.

The processing unit 702 is configured to: when determining that an RRC message in the message 3 includes channel quality information, determine quality of a channel between the network device and the terminal device based on the channel quality information.

In a possible design, the transceiver unit 701 is further configured to: send a first threshold to the terminal device.

Figure 8:
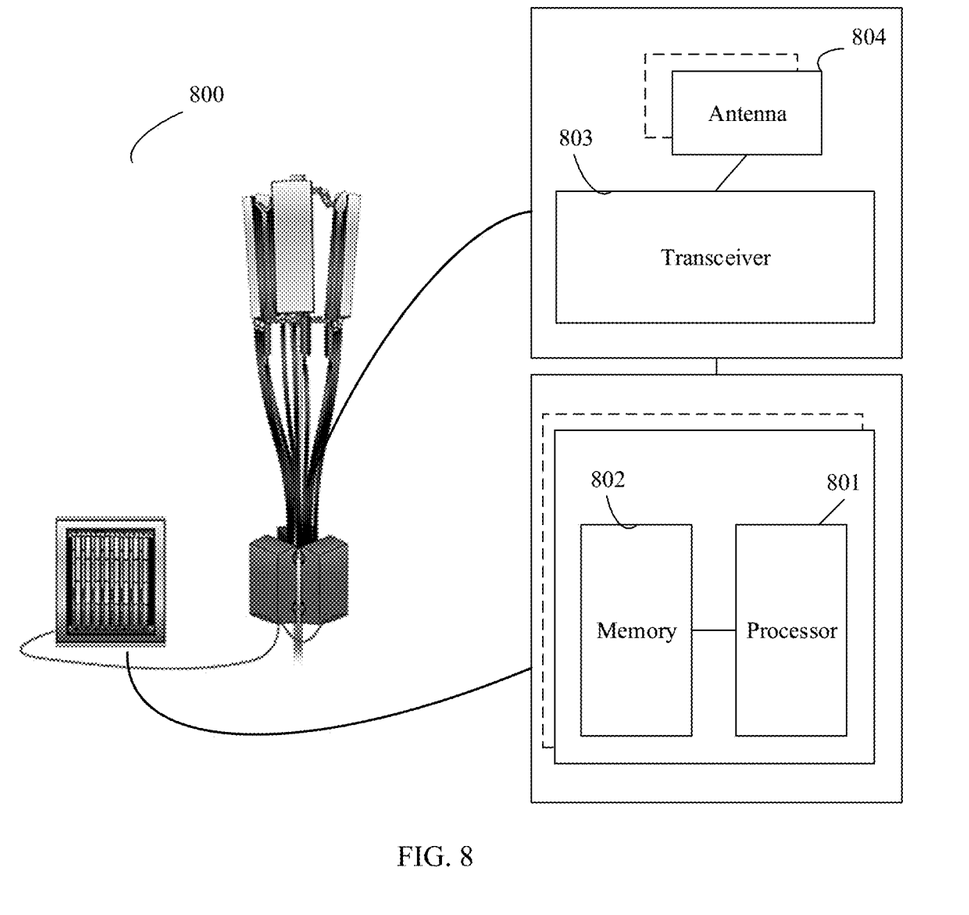
FIG. 8 is a schematic structural diagram of a communications apparatus according to an embodiment of this application.

FIG. 8 is a schematic structural diagram of a communications apparatus according to an embodiment of this application. The communications apparatus shown in FIG. 8 may be an implementation of a hardware circuit of the communications apparatus shown in FIG. 7. The communications apparatus is applicable to the flowchart shown in FIG. 3 or FIG. 4, and perform functions of the network device in the foregoing method embodiments. For ease of description, FIG. 8 shows only main components of the communications apparatus. Optionally, the communications apparatus may be a network device, or may be an apparatus in a network device, for example, a chip or a chip system. The chip system includes at least one chip, and the chip system may further include another circuit structure and/or discrete component. Optionally, for example, the communications apparatus is a network device. As shown in FIG. 8, the communications apparatus 800 includes a processor 801, a memory 802, a transceiver 803, an antenna 804, and the like.

When the communications apparatus 800 is configured to perform a function of the network device in the flowchart shown in FIG. 3:

the transceiver 803 is configured to receive a message 3 sent by a terminal device; and the processor 801 is configured to: when determining that the message 3 includes a first MAC CE, determine quality of a channel between a network device and the terminal device based on channel quality information in the first MAC CE.

In a possible design, an LCP priority of the first MAC CE is higher than an LCP priority of a second MAC CE, and the second MAC CE is a MAC CE including a padding BSR.

In a possible design, the LCP priority of the first MAC CE is lower than an LCP priority of a first MAC SDU, and the first MAC SDU is a MAC SDU including data of a logical channel.

When the communications apparatus is configured to perform an action of the network device in the procedure in FIG. 4:

the transceiver 803 is configured to receive a message 3 sent by a terminal device; and the processor 801 is configured to: when determining that an RRC message in the message 3 includes channel quality information, determine quality of a channel between the network device and the terminal device based on the channel quality information.

In a possible design, the transceiver 803 is further configured to: send a first threshold to the terminal device.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to generate a machine, so that the instructions executed by a processor of a computer or another programmable data processing device generate an apparatus configured to implement a specified function in one or more processes in the flowcharts and/or in one or more blocks in the block diagrams.

These computer program instructions may be stored in a computer-readable memory that can instruct the computer or another data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

Clearly, a person skilled in the art can make various modifications and variations to this application without departing from the scope of this application. In this way, if these modifications and variations to this application fall within the scope of the claims of this application and their equivalent technologies, this application is also intended to cover these modifications and variations.

What is claimed is:

1. A communications method, comprising:
generating, by a terminal device, a first media access control layer control element (MAC CE) and a first media access control service data unit (MAC SDU), wherein the first MAC CE comprises channel quality information of the terminal device and the first MAC SDU comprises a radio resource control (RRC) message;
determining, by the terminal device based on a logical channel prioritization (LCP) priority of the first MAC CE, whether to multiplex the first MAC CE into a message 3, wherein determining whether to multiplex the first MAC CE into the message 3 comprises:
determining whether a transport block size (TBS) needed by all MAC SDUs and all MAC CEs that have an LCP priority higher than the LCP priority of the first MAC CE is less than a TBS of the message 3 and a difference between the TBS needed by all MAC SDUs and all MAC CEs that have an LCP priority higher than the LCP priority of the first MAC CE and the TBS of the message 3 is greater than or equal to a TBS needed by the first MAC CE; and
responsive to determining to multiplex the first MAC CE into the message 3, sending, by the terminal device, the message 3 comprising the first MAC CE and the first MAC SDU to a network device,
wherein the LCP priority of the first MAC SDU is higher than the LCP priority of the first MAC CE.

2. The method according to claim 1, wherein the LCP priority of the first MAC CE is higher than an LCP priority of a second MAC CE, and the second MAC CE comprises a padding buffer status report (BSR).

3. The method according to claim 1, wherein the LCP priority of the first MAC CE is lower than an LCP priority of a second media access control service data unit (MAC SDU), and the second MAC SDU comprises data of a logical channel.

4. The method according to claim 1, wherein the method further comprises:
receiving, by the terminal device, first indication information from the network device, wherein the first indication information indicates the terminal device to report the channel quality information.

5. The method according to claim 1, wherein the terminal device has a capability of reporting the channel quality information.

6. A communications apparatus, comprising:
a processor; and
a computer readable storage medium storing programming for execution by the processor, the programming comprising instructions to:
generate a first media access control layer control element (MAC CE) and a first media access control service data unit (MAC SDU), wherein the first MAC CE comprises channel quality information of the communications apparatus, and the first MAC SDU comprises a radio resource control (RRC) message;
determine, based on a logical channel prioritization (LCP) priority of the first MAC CE, whether to multiplex the first MAC CE into a message 3, wherein determining whether to multiplex the first MAC CE into the message 3 comprises:
determining whether a transport block size (TBS) needed by all MAC SDUs and all MAC CEs that have an LCP priority higher than the LCP priority of the first MAC CE is less than a TBS of the message 3 and a difference between the TBS needed by all MAC SDUs and all MAC CEs that have an LCP priority higher than the LCP priority of the first MAC CE and the TBS of the message 3 is greater than or equal to a TBS needed by the first MAC CE; and
responsive to determining to multiplex the first MAC CE into the message 3, send the message 3 comprising the first MAC CE and the first MAC SDU to a network device,
wherein the LCP priority of the first MAC SDU is higher than the LCP priority of the first MAC CE.

7. The apparatus according to claim 6, wherein the LCP priority of the first MAC CE is higher than an LCP priority of a second MAC CE, and the second MAC CE comprises a padding buffer status report (BSR).

8. The apparatus according to claim 6, wherein the LCP priority of the first MAC CE is lower than an LCP priority of a second media access control service data unit (MAC SDU), and the second MAC SDU comprises data of a logical channel.

9. The apparatus according to claim 6, wherein the programming further comprises instructions to:
receive first indication information from the network device, wherein the first indication information indicates the communications apparatus to report the channel quality information.

10. The apparatus according to claim 6, wherein the communications apparatus has a capability of reporting the channel quality information.

* * * * *